Figure 1:
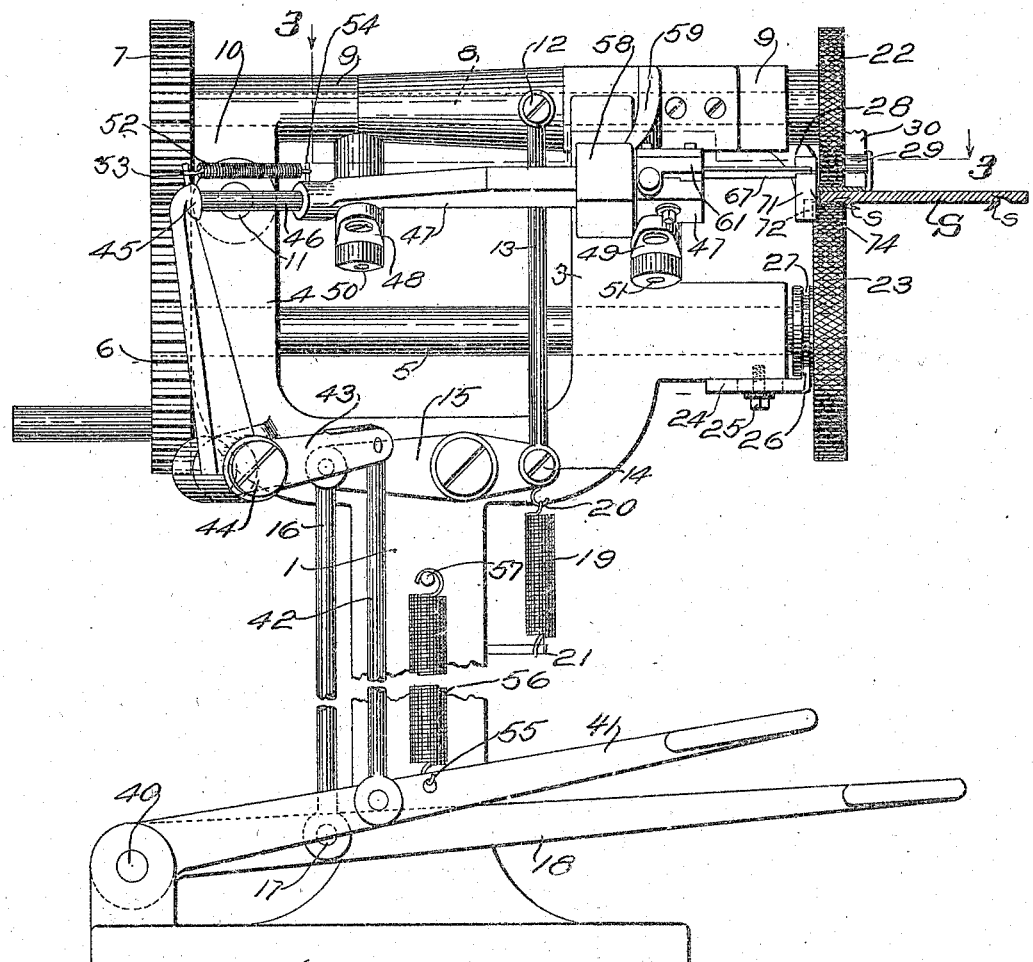

G. T. McLEOD.
WELT LAYING AND ATTACHING MACHINE.
APPLICATION FILED JUNE 17, 1909.
957,987.
Patented May 17, 1910.
2 SHEETS—SHEET 2.
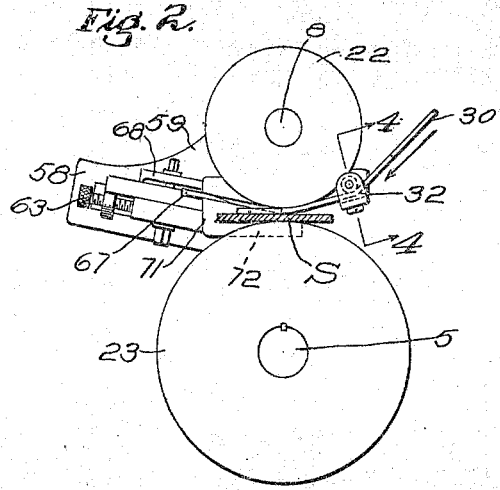
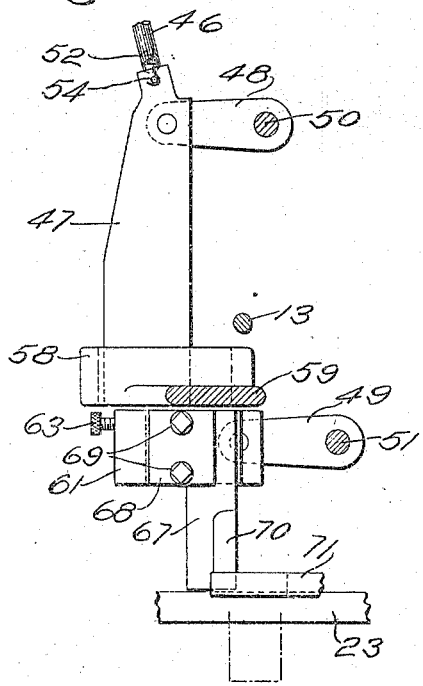
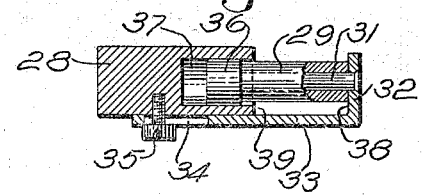
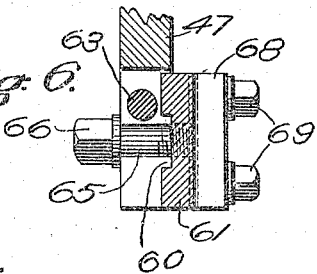
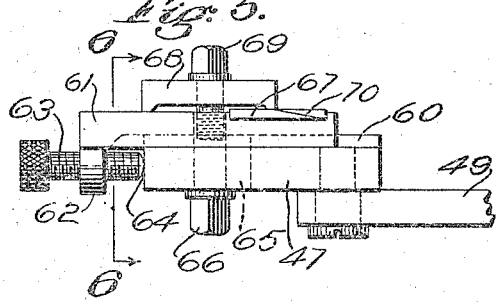
Witnesses:
Roswell F. Hatch.
Redfield H. Allen.
Inventor
George T. McLeod
By Robt. F. Harris.
atty.

UNITED STATES PATENT OFFICE.

GEORGE T. McLEOD, OF DEDHAM, MASSACHUSETTS, ASSIGNOR TO THOMAS G. PLANT, OF BOSTON, MASSACHUSETTS.

WELT LAYING AND ATTACHING MACHINE.

957,987.   Specification of Letters Patent.   Patented May 17, 1910.

Application filed June 17, 1909. Serial No. 502,813.

*To all whom it may concern:*

Be it known that I, GEORGE T. McLEOD, a citizen of the United States, residing at Dedham, in the county of Norfolk and State of Massachusetts, have invented an Improvement in Welt Laying and Attaching Machines, of which the following description, in connection with the accompanying drawings, is a specification, like characters on the drawings representing like parts.

The invention to be described relates to welt laying and attaching machines for laying a welt upon the surface and about the edge of a shoe sole, the welt being attached to the sole by cement or other adhesive.

The aims and purposes of the present invention are to provide a machine of the above general character which will be simple in construction, efficient in operation, and whereby welts of varying dimensions may be laid upon and attached to the edges of shoe soles in varying relation. These general objects of the invention will be best made clear from the following description and accompanying drawings of one form of means for carrying the invention into practical effect, it being understood that the invention, in its true scope, is defined by the claims.

In the drawings: Figure 1 is a side elevation of one form of machine embodying the present invention; Fig. 2 is a front elevation of the upper portion of the machine head, showing more particularly the relation of the feed wheel, the presser wheel, the welt guide and knife; Fig. 3 is a detail sectional view on the line 3—3, Fig. 1, showing the knife carrier, the knife, and connected parts, some of the machine elements being omitted for clearness of illustration; Fig. 4 is a sectional detail, on the line 4—4, Fig. 2, of the welt guide disposed in front of the nip between the presser and feed rolls; Fig. 5 is an enlarged end view of the knife carrier and knife, showing the manner of holding and adjusting the knife, and Fig. 6 is a section on line 6—6, Fig. 5.

The frame of the machine may be of any usual construction and is herein shown as a suitable column 1 mounted on a base 2, said column having rising therefrom the front and rear supporting portions 3 and 4, respectively.

Mounted in suitable bearings in the risers 3, 4, is a shaft 5 carrying a gear or pinion 6 which meshes with a corresponding gear or pinion 7 mounted on the shaft 8 held in suitable bearings 9 carried by a frame 10 hinged at 11 to the riser 4, the construction being such that the bearing 9 carrying the shaft 8 and gear or pinion 7 may be lifted or depressed with relation to the shaft 5 for purposes that will presently appear.

Connected to the frame 10 at 12 is a rod 13 jointed at 14 to one end of a lever 15 pivotally mounted on the machine frame and having connected at its other end a treadle rod 16 which is pivotally jointed at 17 to the treadle 18, a spring 19 connected at 20 to the lever 15 and to a pin 21 fixed to the machine frame; the construction being such that the treadle 18 is normally held in raised position with the frame 10 held downward toward the shaft 5 by means of the spring 19, but upon depression of the treadle 18 the frame 10 may be swung around its pivotal point 11 to separate the presser and feed rolls, to be described, sufficiently to enable work to be placed between them, there being sufficient play between the teeth of the gears or pinions 6, 7 to permit this movement. The shaft 5 may be driven in any suitable manner.

Secured to the outer end of the shaft 8 is the presser roll 22 which is normally held pressed toward the feed roll 23 by the spring 19, as will be clearly apparent. Having reference to Figs. 1 and 2, it will be noted that the feed roll 23 is splined to the shaft 5 so that while it is rotatable with said shaft it is adjustable longitudinally thereof by suitable means, one form of which is indicated in Fig. 1, comprising a finger 24 provided with a slot through which passes a set screw 25, said finger having an engaging portion 26 which engages a recessed collar 27 secured to the feed roll 23, the construction being such that the feed roll may be adjusted longitudinally of the shaft 5 by the means described to suit the conditions of use in connection with certain sizes of shoe soles, as will hereinafter more fully appear.

Carried by a bracket 28 supported by the bearing portion of the upper framework 10, Figs. 1, 2 and 4, is a welt guide disposed directly in the line of feed passing between the presser and feed rolls 22 and 23 respectively. In the present form of the invention the welt guide comprises a roll 29 about which the welt 30 passes from a source of supply to the nip between the presser and feed rolls 22 and 23. It is desirable that the welt be not only guided in the manner substantially as described, but that edge gages be provided to definitely locate the welt with reference to the sole edge to which it is to be applied. To this end the welt guide 29 is in the form of a roll mounted on a supporting pin 31, Fig. 4, the outer end of said pin being sustained by an upright arm 32 of an adjustable member 33 which may be connected to the bracket 28 by means of a slot 34 in said member 33 and a set screw 35, or otherwise. The opposite end of the pin 31 is carried by a plunger or piston 36, Fig. 4, movable back and forth in the recess or opening 37 formed in the bracket 28. From the construction described it will be apparent that while the welt guide or roll 29 may serve as a guide for the welt from the source of supply to the nip between the presser and feed rolls, the straight edge portions 38 and 39 of the adjustable member 33 and the edge of the bracket 28 serve as edge gages for the welt which passes below the roll or welt guide 29 and above the member 33, as will be clearly apparent from Figs. 2 and 4.

By locating the welt guide or roll 29 and its adjunctive parts directly in line with the nip between the presser and feed rolls, the welt is directed between such rolls and into proper position for laying upon the shoe sole to which it is to be cemented.

The shoe sole S and the end of the welt 30 are introduced between the presser and feed rolls by depressing the treadle 18 which raises the presser roll, and by release of said treadle the presser roll is forced downward upon the work, laying or pressing the welt along the edge portion of the sole S, as will be clearly seen from Fig. 1, the welt being guided directly to the nip between the rolls by the welt guide and the edge gages hereinbefore described, while the shoe sole S is guided during its feed movement between the rolls by the face of the feed roll 23 bearing against the channel lip s.

After the welt has been laid and cemented to the shoe sole, substantially as hereinbefore pointed out, it is necessary to cut the welt leading from the source of supply from that attached to the shoe sole, and to this end the following means is employed as one form of this feature of the invention.

Pivotally mounted at 40 is a treadle 41 rising from which is a rod 42 connected to one arm of the bell-crank lever 43 pivoted at 44 to the machine frame, the upper end of said lever 43 having a bearing face 45 contacting with the end of a rod 46 bearing against a knife carrier 47 which is supported by the links 48 and 49 pivotally mounted at 50 and 51, respectively, to the upper frame 10, the end of the rod 46 and the face 45 of the lever 43 being held in contact by means of a spring 52 connected at one end to the upper arm of the lever 43, as at 53, and at its other end to the knife carrier, as at 54. Connected to the treadle 41 at 55 is a spring 56, the other end of which is connected at 57 to the machine frame, said spring normally acting to hold the treadle 41 in raised position, as indicated in Fig. 1.

The knife carrier 47 passes through a guide 58, Figs. 1 and 3, carried by a bracket 59 depending from the upper frame 10, said guide being appropriately slotted, as indicated by dotted lines in Fig. 3, to permit the knife carrier 47 to move with a forward and side cutting stroke due to the parallel link supports of said carrier.

The forward end of the knife carrier 47 is provided with guideways 60, Fig. 5, extending transversely thereof, and adjustable in these guideways is the knife head 61, the rear end of which is provided with a screw-threaded lug 62 into which is screw-threaded the adjusting screw 63, the end of which bears at 64 against the end of the knife carrier 47. The knife carrier 47 is slotted at 65, Figs. 5 and 6, and through said slot passes a clamping bolt 66 which is screw-threaded into the knife head 61, the construction being such that upon loosening the bolt 66 the adjusting screw 63 may be manipulated to adjust the knife head 61 transversely of the knife carrier 47.

Mounted in a suitable recess in the knife head 61 is the knife 67, Figs. 3 and 5, said knife being held to its seat by means of a cap plate 68 secured in place by the screw bolts 69 or other appropriate means, Figs. 5 and 6.

It will be noted, see Figs. 3 and 5, that the knife 67 has a forwardly projecting portion provided with a beveled cutting edge 70, and in order to properly guide and sustain the forwardly projecting portion during its forward and sidewise sweeping stroke as it cuts the welt, the said knife passes through a knife guide 71 appropriately supported, as from the bracket arm 28, Fig. 1, from the upper frame 10. It is desirable that the knife guide 71 be disposed close to the cutting point of the knife as it severs the welt, and in order that this may be conveniently effected the knife guide 71 is provided with a recessed portion 72, Figs. 1 and 2, to accommodate the rear portion of the feed roll 23, the face edge 74 of the knife guide thus being brought into position with respect to the presser roll and the edge of the welt to further act as a guide for the edge of the welt directly opposite the nip between the presser and feed rolls.

Inasmuch as the soles vary in size and dimensions and the distance between the channel lip s and the edge of the sole may likewise vary, the feed roll 23 is made adjustable on its shaft 5, substantially in the manner as hereinbefore pointed out, so that in treating soles of different edge width the feed roll 23 may be properly adjusted longitudinally of the shaft 5 to bring its face edge against the channel lip, as indicated in Fig. 1, the recess 72 in the knife guide permitting this adjustment.

From the construction described it will be noted that the welt is guided to the nip between the presser and feed rolls in a direct line leading thereto, and that it has its edges properly guided not only at a point in front of the presser and feed rolls but also at a point opposite the nip between said rolls, and that the feed roll may be appropriately adjusted to suit the varying sizes of work. Likewise it will be noted that the knife carrier is mounted to swing with a shearing cut by virtue of the parallel link motion imparted thereto, due to its link supports 48 and 49, so that the knife may be moved from the full to dotted line position, in Fig. 3, and sever the welt with a slanting cut downward through the welt.

Obviously the details of the invention in many respects may be altered and changed to suit varying conditions of use, it being understood that the invention is not confined to the details illustrated and described, except as hereinafter pointed out by the claims.

What is claimed is:

1. In a welt laying and attaching machine, the combination of a feed roll and presser roll between which the edge of the sole and the welt are passed, a welt guide disposed in front of and above the nip between and in a plane passing vertically through said rolls, and means directed diagonally toward the nip between the rolls for severing the welt oblique to the surface of the sole.

2. In a welt laying and attaching machine, the combination of a feed roll and presser roll between which the edge of the sole and the welt are passed, said feed roll supporting the sole between the edge and channel lip, a welt guide disposed in front of and above the nip between said rolls, and means for relatively adjusting the feed and presser rolls substantially parallel to the acting surfaces of said rolls to cause the feed roll to sustain for the action of the presser roll varying widths of soles between the edge and channel lip.

3. In a welt laying and attaching machine, the combination of a feed roll and presser roll between which the edge of the sole and the welt are passed, a welt guide disposed in front of and above the nip between said rolls, a knife for severing the welt in an inclined direction toward the nip between the presser and feed rolls, and means for actuating the knife in a combined end and sidewise direction to produce a shearing cut oblique and toward the shoe sole.

4. In a welt laying and attaching machine, the combination of a feed roll and presser roll between which the edge of the sole and the welt are passed, a welt guide disposed in front of and above the nip between said rolls, a knife for severing the welt in an inclined direction toward the nip between the presser and feed rolls, a knife guide having a portion for guiding the welt opposite the nip between the said rolls, and means for actuating the knife to sever the welt.

5. In a welt laying and attaching machine, the combination of a feed roll and presser roll between which the edge of the sole and the welt are passed, a welt guide disposed in front of and above the nip between said rolls, comprising a guide roll, a bracket carrying said guide roll, and an adjustable member connected to said bracket for varying the extent of the guiding surface of said roll.

6. In a welt laying and attaching machine, the combination of a feed roll and presser roll between which the edge of the sole and the welt are passed, a welt guide disposed in front of and above the nip between said rolls, and comprising a bracket, and a guide roll arranged to telescope with relation to said bracket, said bracket having edge gages between which the welt passes as it travels about said roll.

7. In a welt laying and attaching machine, the combination of a feed roll and presser roll between which the edge of the sole and the welt are passed, a welt guide disposed in front of and above the nip between said rolls, severing means disposed at the side of the presser and feed rolls opposite the said welt guide for severing the welt, and means to impart to said severing means movement in an oblique direction toward the nip between the rolls.

8. In a welt laying and attaching machine, the combination of a feed roll and presser roll between which the welt and edge of the sole are passed, a guide disposed in front and above the nip of the feed and presser rolls, and a knife disposed on the opposite side of said presser and feed rolls to sever the welt and leave a part of the welt extending from the source of supply between the rolls.

9. In a welt laying and attaching machine, the combination of a feed roll and presser roll between which the welt and edge of the sole are passed, a guide disposed in front and above the nip of the feed and presser rolls, a knife disposed in rear of the feed and presser rolls, and means to impart to the knife a movement toward the nip of the said rolls to sever the welt and leave a part of the welt extending from the source of supply between the feed and presser rolls.

10. In a welt laying and attaching machine, the combination of a feed shaft, a presser roll shaft, feed and presser rolls mounted respectively on said shafts, said feed roll having a supporting surface of a width to sustain the surface of a sole between the edge and channel lip, a welt guide disposed in front of the nip between the feed and presser rolls, means for adjusting the feed roll on its shaft in a longitudinal direction to suit different sizes of work, and means for locking the feed roll in adjusted position.

11. In a welt laying and attaching machine, the combination of a feed roll and a presser roll between which the edge of the sole and the welt are passed, a welt guide to direct the welt to the nip between said rolls, a knife, links supporting said knife, and means to cause said links to impart a forward and sidewise movement to the knife in a direction toward the nip between the said rolls to sever the welt.

12. In a welt laying and attaching machine, the combination of a feed roll and a presser roll between which the edge of the sole and the welt are passed, a welt guide to direct the welt between the rolls, a knife, and means to operate the knife to cut the welt and leave the portion extending from the source of supply between the rolls.

13. In a welt laying and attaching machine, the combination of a feed roll and a presser roll between which the edge of the sole and the welt are passed, a welt guide to direct the welt between the rolls, a knife disposed at one side of the rolls, and means to move the knife in a curved path toward the shoe sole to sever the welt.

In testimony whereof, I have signed my name to this specification, in the presence of two subscribing witnesses.

GEORGE T. McLEOD.

Witnesses:
CHARLES M. LAWRENCE,
EDWARD H. J. COOK.